(12) United States Patent
Stava

(10) Patent No.: US 6,501,049 B2
(45) Date of Patent: Dec. 31, 2002

(54) SHORT CIRCUIT ARC WELDER AND METHOD OF CONTROLLING SAME

(75) Inventor: Elliott K. Stava, Sagamore Hills, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/766,787

(22) Filed: Jan. 23, 2001

(65) Prior Publication Data

US 2002/0125235 A1 Sep. 12, 2002

(51) Int. Cl.$^7$ ................................................ B23K 9/095
(52) U.S. Cl. ........................... 219/137 PS; 219/130.21; 219/130.31; 219/130.32
(58) Field of Search ....................... 219/130.33, 130.21, 219/130.31, 130.32, 130.51, 137 PS

(56) References Cited

U.S. PATENT DOCUMENTS

| | | | |
|---|---|---|---|
| 3,459,920 A | | 8/1969 | Sevenco |
| 3,792,225 A | | 2/1974 | Needham et al. |
| 3,809,853 A | * | 5/1974 | Manz .................... 219/130.21 |
| 4,020,320 A | | 4/1977 | Pijls et al. |
| 4,125,759 A | * | 11/1978 | Kiyohara et al. ...... 219/130.32 |
| 4,518,844 A | * | 5/1985 | Needham ............... 219/130.21 |
| 4,546,234 A | | 10/1985 | Ogasawara et al. |
| 4,866,247 A | | 9/1989 | Parks et al. |
| 4,889,969 A | * | 12/1989 | Kawai et al. .......... 219/130.21 |
| 5,148,001 A | | 9/1992 | Stava |
| 5,278,390 A | | 1/1994 | Blankenship |
| 6,051,810 A | | 4/2000 | Stava |

* cited by examiner

Primary Examiner—Clifford C. Shaw
(74) Attorney, Agent, or Firm—Fay, Sharpe, Fagan, Minnich & McKee

(57) ABSTRACT

An electric arc welder operated to perform a short circuit process with a first waveform controlling a short condition followed by a second waveform controlling an arc condition, wherein the welder includes a comparator to create an arc signal when the short condition terminates and a controller shifting the welder from control by the first waveform to control by the second waveform in response to creation of the arc signal.

24 Claims, 4 Drawing Sheets

SHORT CIRCUIT ARC WELDER AND METHOD OF CONTROLLING SAME

The invention relates to the art of arc welding and more particularly to an electric arc welder having a unique controller for performing short circuit electric arc welding.

INCORPORATION BY REFERENCE

In the field of electric arc welding of the type especially useful in pipe welding, weld puddle temperature and fluidity are controlled by using a short circuit arc welding process known as STT welding. This technology was developed and patented by The Lincoln Electric Company, and is disclosed in several patents, including Parks U.S. Pat. No. 4,866,247, Stava U.S. Pat. No. 5,148,001 and Stava U.S. Pat. No. 6,051,810. These three patents show STT welding technology in which the present invention is preferably used. Since this technology is well known, incorporation by reference of these patents provides general background information for understanding the implementation of the invention. In practicing STT short circuit welding, a waveform generator produces the precise waveform used in the welding process by creating a series of current pulses the widths of which determine the current flowing in the welding process at precise portions of the cycle. In practicing this type of electric arc welding, as well as other short circuit processes, it is common to use a Power Wave electric arc welder sold by The Lincoln Electric Company. Such inverter based welder is disclosed in Blankenship U.S. Pat. No. 5,278,390. This patent is also incorporated by reference to disclose the general type of welder used to implement the present invention.

BACKGROUND OF INVENTION

Electric arc welding is performed in a variety of processes, such as spray welding, globular welding, and short circuit welding. Irrespective of the process employed, an inverter converts three phase line current to the desired voltage or current. An inverter based power supply for electric arc welding has a digitally based control to produce a desired output current or voltage at the arc welding process. In pipe welding, pulse welding or short circuit welding is preferred for the first weld bead, known as the "root pass", that closes the open gap between edges of adjacent workpieces. For best results, the short circuit electric arc welding procedure is implemented by using the patented STT technology. In this technology, a precise current waveform is outputted by the power supply. Spatter reduction is affected by drastically reducing the current just before the shorted metal separates to create a new arc. Thereafter, the current waveform produces a plasma boost for melting the end of the electrode awaiting the next short. The peak current of the plasma boost pulse is gradually reduced in a current tailout until a set background current is reached. Thereafter, the background current is maintained until the molten metal ball shorts against the workpiece causing the next cycle. In this STT electric arc welding process, the current waveform is accurately controlled by a series of current pulses, the widths of which determine the magnitude of the current at any given time in the waveform. By using this technique, the current waveform allows control of the puddle temperature and/or fluidity. Such capability is vital in gap welding applications, such as open root pass in pipe welding. If the puddle is too cold, a lack of metal fusion can result. As a corollary, when the puddle is too hot, a poor internal back bead is possible caused by the weld metal "sucking back" into the root. In the past, STT short circuit welding has been implemented as a current control process. If the operator wants to change heat in the arc and/or puddle, he must adjust current by the machine setting.

THE INVENTION

In accordance with the present invention, there is provided an electric arc welder that can function in the STT mode where heat is controlled merely by changing the position of the electrode. As the extension length increases during the arc condition of a short circuit welding process, the heat decreases, and vice versa. The invention is a controller that generates a voltage waveform for the arc portion or condition of a short circuit welding process. Consequently, the power supply is operable in both current and voltage control modes so current control is used when best for the short portion of the welding cycle, while voltage control is used for the plasma portion. Consequently, the current mode of the power supply will use a waveform control that is the same as the STT welder to implement the short circuit condition of the welding cycle. When the molten metal ball on the end of an electrode shorts against the workpiece, a controlled pinch current waveform is implemented. A dv/dt, dr/dt or dt/dt detector determines an impending break or separation of metal from the electrode. Then, a power switch is opened to instantaneously reduce current flow before the electrode separates. This action minimizes spatter. When the short is broken, the arc condition or plasma condition is immediately established. The power supply electronics detects the break in the electrode as an increase in arc voltage. The power supply shifts into the voltage control phase. A voltage waveform is generated to provide a peak voltage that is used to generate a voltage defined power boost pulse. In this voltage mode, current will change due to the desired fixed peak voltage of the voltage waveform. If the voltage control circuitry is precise and the extension length maintained reasonably constant, the welding current will be reasonably constant. The voltage controlled portion of the welding process has a predetermined tailout and a set background voltage to which the voltage transitions to await the next short circuit. By controlling the voltage during the arc condition of the short circuit welding process, the weld puddle temperature and fluidity can be accurately controlled to optimize the welding process and operate in the voltage range of the power supply. This novel technique of using a current waveform during the short circuit condition and a voltage waveform during the arc condition is applicable in any short circuit electric arc welding process. The invention merely involves using a controlled voltage waveform during the arc condition of a short circuit welding process. The short condition of the welding process can be controlled in accordance with standard technology or by the precision current waveform used in the STT technology. The basic aspect of the invention is the current implementation of the short circuit condition with a precision voltage waveform for the arc or plasma condition of the welding process.

In accordance with an aspect of the invention, there is provided an electric arc welder operated to perform a short circuit process with a first waveform controlling a short condition followed by a second waveform controlling the arc condition. The welder comprises a comparator to create an arc signal when the short condition terminates. A controller then shifts the welder from control by the first waveform to control by the second waveform. In response to the creation of the arc signal, the second waveform is a precise voltage waveform wherein the first waveform is a current waveform which may be somewhat conventional. In the broad aspect of the invention, the first waveform is a current controlled waveform and the second waveform is a voltage controlled waveform. Of course, the second waveform is sometimes a wattage control waveform or a joules control waveform. Both of these complex parameters are functions of the arc voltage. Of course, the waveforms are implemented as a series of current pulses that define either the current waveform or the voltage waveform of the invention.

Another aspect of the invention is the provision of a controller for an electric arc welder operated to perform a short circuit process, with a short condition followed by an arc condition. Such controller has a first current control mode during the short condition and a second control mode distinct from the current control mode during the arc condition. This second control mode is preferably voltage tailored by a precise waveform. It has been implemented as a wattage in the precise waveform and a joules control in a precise waveform. The waveform is created in the weld process by a series of current pulses generated or created at a rate exceeding 18 kHz and preferably substantially greater than 20 kHz. In practice, these pulses are created by a pulse width modulator used in a closed loop feedback to control either the current or voltage in accordance with the desired profile outputted from a waveform generator.

Yet a further aspect of the invention is the provision of a method of controlling an electric arc welder operated to perform a short circuit process with a short condition followed by an arc condition. This method comprises employing a first current control mode during the short circuit condition and a second control mode distinct from the current control mode during the arc condition. In practice, this method involves the act of implementing the second control mode as a voltage mode which follows a precise waveform during the arc condition. This provides the advantages previously discussed. The power supply is operated in its voltage range irrespective of the arc resistance.

In accordance with another aspect of the invention, there is provided a digital override switch forcing current control of the power supply during arc condition. This override occurs after the molten metal ball has been formed by voltage control.

The primary object of the present invention is the provision of an electric arc welder, controller for the welder, and method of short circuit welding, wherein the arc condition is accurately controlled by a waveform as a function of voltage. This precision control waveform can be voltage, wattage, which is voltage times current, or joules, which is voltage times current integrated. This voltage function control of the arc condition in a short circuit welding process allows precise heat control of the weld puddle during the welding procedure and operation in the voltage range of the power supply.

Another object of the present invention is the provision of a welder, controller and method, as defined above, which a welder, controller and method can be implemented by a single power supply and used for standard short circuit welding and/or STT short circuit welding.

Yet another object of the present invention is the provision of a welder, controller and method, as defined above, which welder, controller and method employs the advantages of current control during the short condition and the advantages of voltage control during the arc condition.

These objects and advantages will become apparent from the following description taken together with the accompanying drawings.

PREFERRED EMBODIMENT OF THE INVENTION

Figure 1:
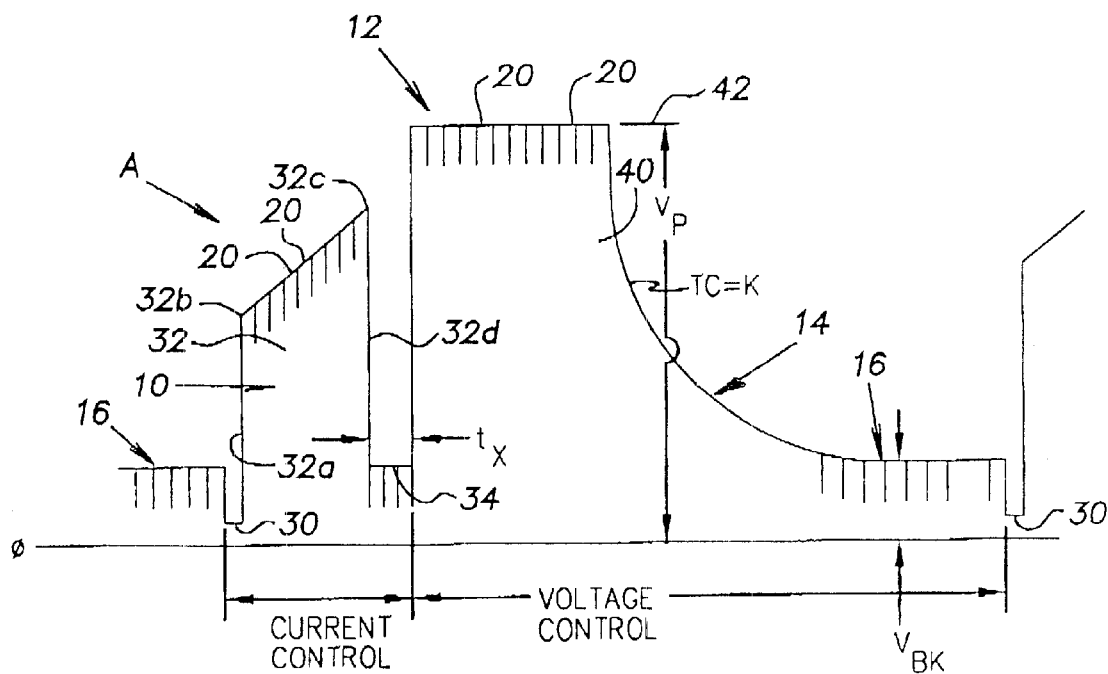
FIG. 1 is a graph showing the waveforms used in practicing the preferred embodiment of the present invention.
Figure 2:
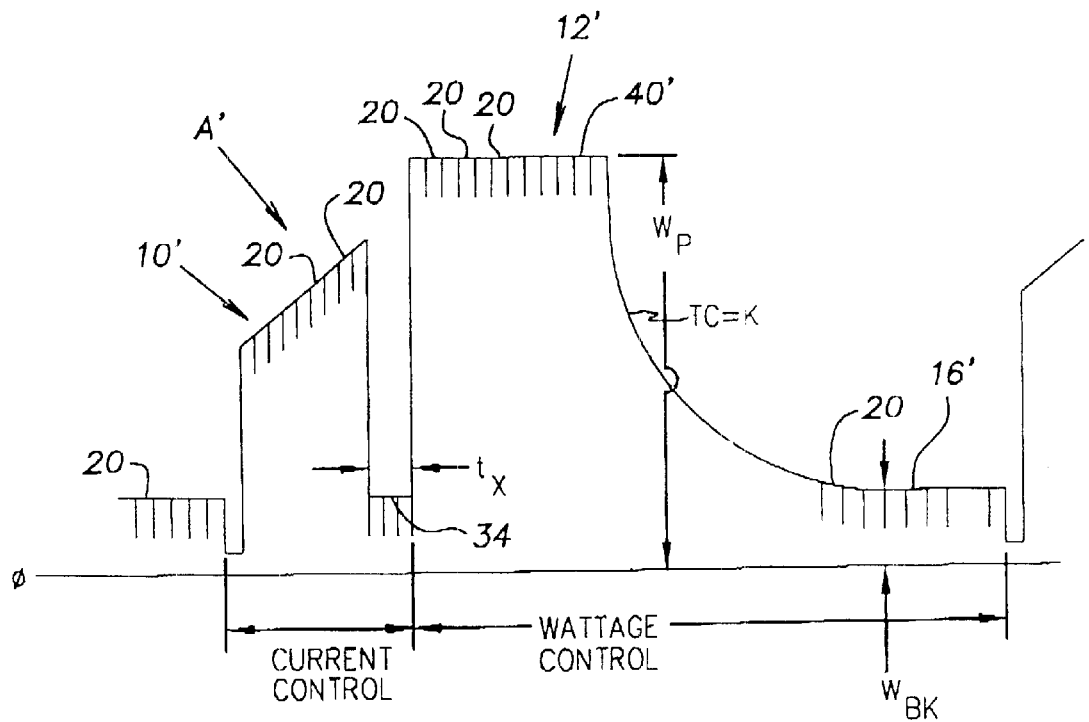
FIG. 2 is a graph similar to FIG. 1 wherein the waveform is a complex function of voltage, i.e. wattage or joules.

Referring now to the drawings wherein the showings are for the purpose of illustrating a preferred embodiment of the invention only, FIG. 1 shows an STT type waveform A for a short circuit welding process including a short condition 10, an arc condition 12, tailout 14 and background 16. This waveform is the current profile through the weld and is formed by a plurality of current pulses 20 created at a frequency exceeding 18 kHz. The widths of the current pulses control the magnitude or height of the waveform as illustrated in FIG. 1. Short circuit welding includes alternating between an arc or plasma condition and a short condition initiated at the time a molten metal ball on the end of an electrode contacts the workpiece. This event occurs at time 30. Metal is then transferred from the electrode to the workpiece by surface tension action. This action is accelerated by pinch pulse 32 used to control the current with a profile having a rapidly increasing current section 32a, a break point 32b to give a second slope, and a premonition point 32c. As will be explained later, a dv/dt, dr/dt or dp/dt circuit detects when the surface tension transfer of molten metal is ready to separate or explode. At that time, the voltage increases because the cross section decreases rapidly. This event anticipates the explosion or separation of the molten electrode tip from the workpiece. To reduce spatter, the waveform includes a current plunge section 32d before actual metal separation. Current pinch pulse 32 is controlled in the STT technology by the shape of pinch pulse 32 shown in FIG. 1. Thereafter, there is a slight delay 34 indicated to be time $t_x$ before the current rapidly increases to create plasma boost pulse 40. In the STT technology, this rapid increase in current is toward a fixed peak current. In the present invention, the controller shifts the power supply between current control during the short condition and to voltage control during the arc condition 12. This causes a current increase in the plasma boost pulse 40 toward a peak 42 of a voltage function. In the preferred embodiment, peak 42 is a peak voltage that is held constant. Such constant voltage normally produces a generally constant current as shown in FIG. 1. After the desired amount of energy has been transmitted to create a molten metal ball, the voltage of the power supply transitions along time constant curve or tailout 14 where the time constant CT is equal to K. This curve, or tailout, transitions to a background voltage level 16. In the present invention, the waveform implemented during arc condition 12 is a voltage waveform having a peak voltage $V_p$ and a background voltage $V_{BK}$. At the end of the background current there is a new short at time 30 causing the voltage to plunge and shift the power supply to a current control for the pinch pulse 32. Thus, the invention involves using current control during the short condition 10 and voltage control during arc position 12. In each instance, these controls follow predetermined waveforms to produce the desired characteristics. Consequently, the arc condition 12 is a voltage function. In the preferred embodiment, the voltage function is the voltage across the arc. As will be explained later, a standard closed loop control operated during the short condition to create a desired presized, preselected waveform during condition 10. The same concept, i.e. current control during the short condition and voltage function control during condition 12', is used in the second embodiment of the invention illustrated in FIG. 2. Waveform A' includes a short condition 10' and an arc condition 12'. The voltage function used during condition 12' for closed loop control is wattage. The plasma boost pulse 40' and background 16' are peak wattage $W_P$ and background wattage $W_{BK}$, respectively. The voltage function is sometimes joules, so a joules closed loop feedback produces a waveform as shown in FIGS. 1 and 2.

Figure 3:
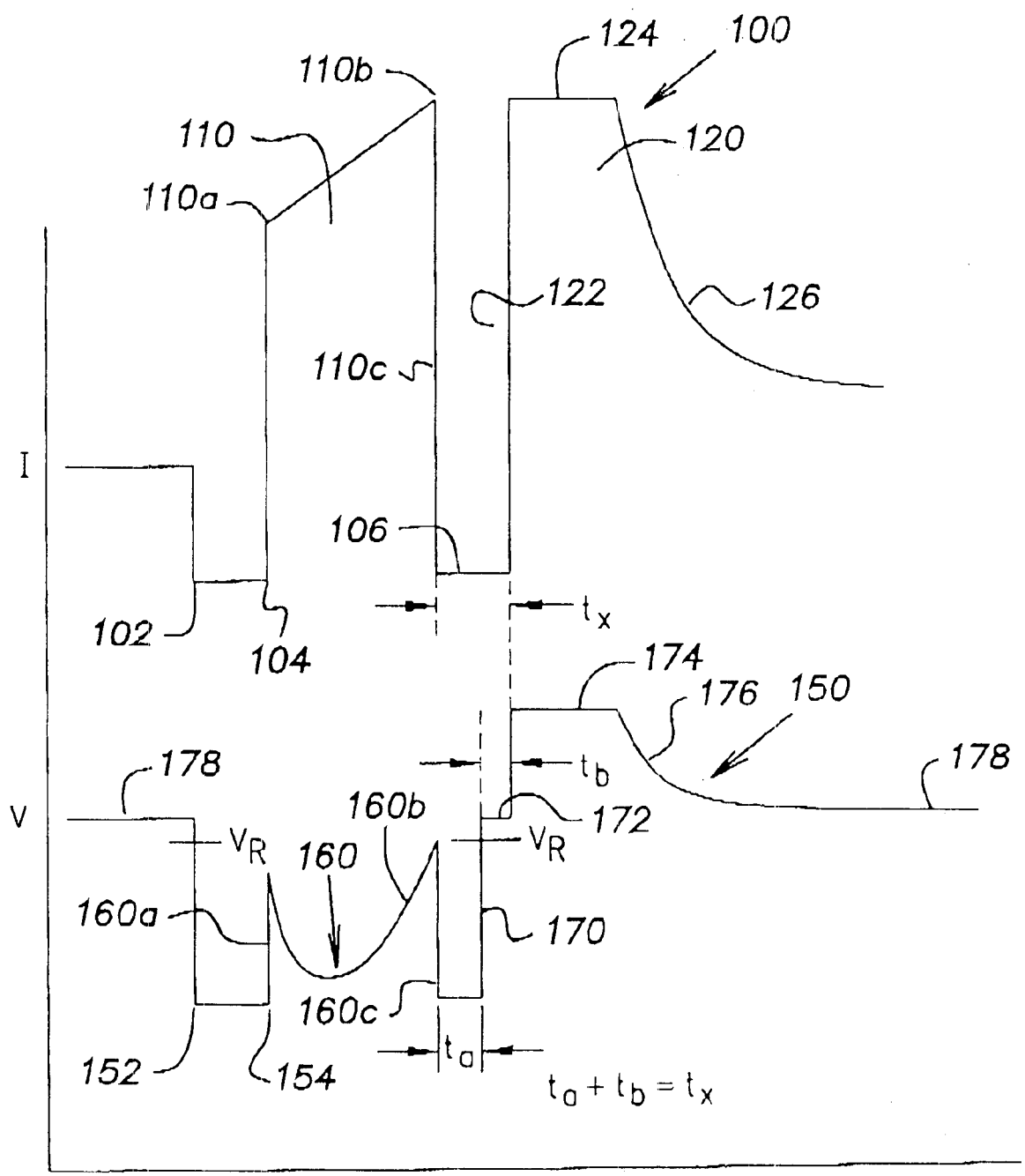
FIG. 3 is a graph showing a current curve and a voltage curve of an arc welding process using the present invention.

Utilizing a pulse width modulated, inverter based power supply of the type used in the preferred embodiment of the present invention results in the current and voltage curves schematically illustrated in FIG. 3. Current curve 100 plunges at time 102 when the molten metal ball is shorted to the workpiece causing the voltage to plunge. Such voltage decrease is to a level less than a reference voltage $V_R$ causing the power supply to shift from voltage control to current control. Current control implements the short portion of the weld cycle. The current is held down for a short time until time 104. Current control of the power supply is then released allowing a rapid increase in the current to create pinch pulse 110 having a break point 110a and a premonition point 110b. As previously explained, the current control of the power supply plunges the current as indicated by portion 110c. Thus, the explosion or metal separation occurs at the low current 106 that is maintained for a time $t_a$. During this time, the current mode of operation allows an increase in voltage to create current pulse 120 which current is dictated by the predesigned voltage control waveform. Current pulse 120 has a steep, leading edge 122 during which the voltage is at the desired level while the current is advancing toward the upper peak current 124. This current level is caused by the set peak voltage used during voltage control of the power supply. Thereafter, current pulse 120 transitions into background portion of the arc condition along gradual curve 126. Pulse 120 is a current pulse with a shape dictated by the desired voltage waveform shown in the right portion of the voltage curve at the bottom portion of FIG. 3. Current control defines pulse 110 and voltage control defines pulse 120. At point 152, the voltage control experiences a short circuit and control is shifted from voltage to current. Thereafter, a low current is maintained until time 104. Current pulse 110 is then created by the desired current waveform. This control dictates the voltage variations that follows curve 160. The power supply maintains the desired shape of pinch pulse 110. Voltage immediately rises along portion 160a as a result of the desired current. At break point 110a, the voltage transitions along curve 160b until portion 160c where the voltage is plunged in response to the premonition signal. This is still in the current control mode. The shorted electrode separates at time 170, causing the voltage to increase to a level above reference $V_R$ causing the power supply to shift to a voltage control waveform level 172 as the arc voltage obtained when arc is reestablished at low current 106. This next waveform includes the peak voltage 174. To reach the peak voltage, there is a time $T_b$. Time $T_a$ plus time $T_b$ equals the previously discussed delay 34 having a time $T_x$. After processing of the voltage waveform to melt the electrode, the voltage transitions along portion 176 to the background voltage 178 where the voltage is held awaiting the next short circuit. In practice, 100 to 300 cycles of pulses shown in FIG. 3 are performed each second. By adjusting the peak voltage and/or background voltage during the arc or plasma condition of the cycle, the temperature and/or fluidity of the weld puddle is controlled.

Figures 4, 4A:
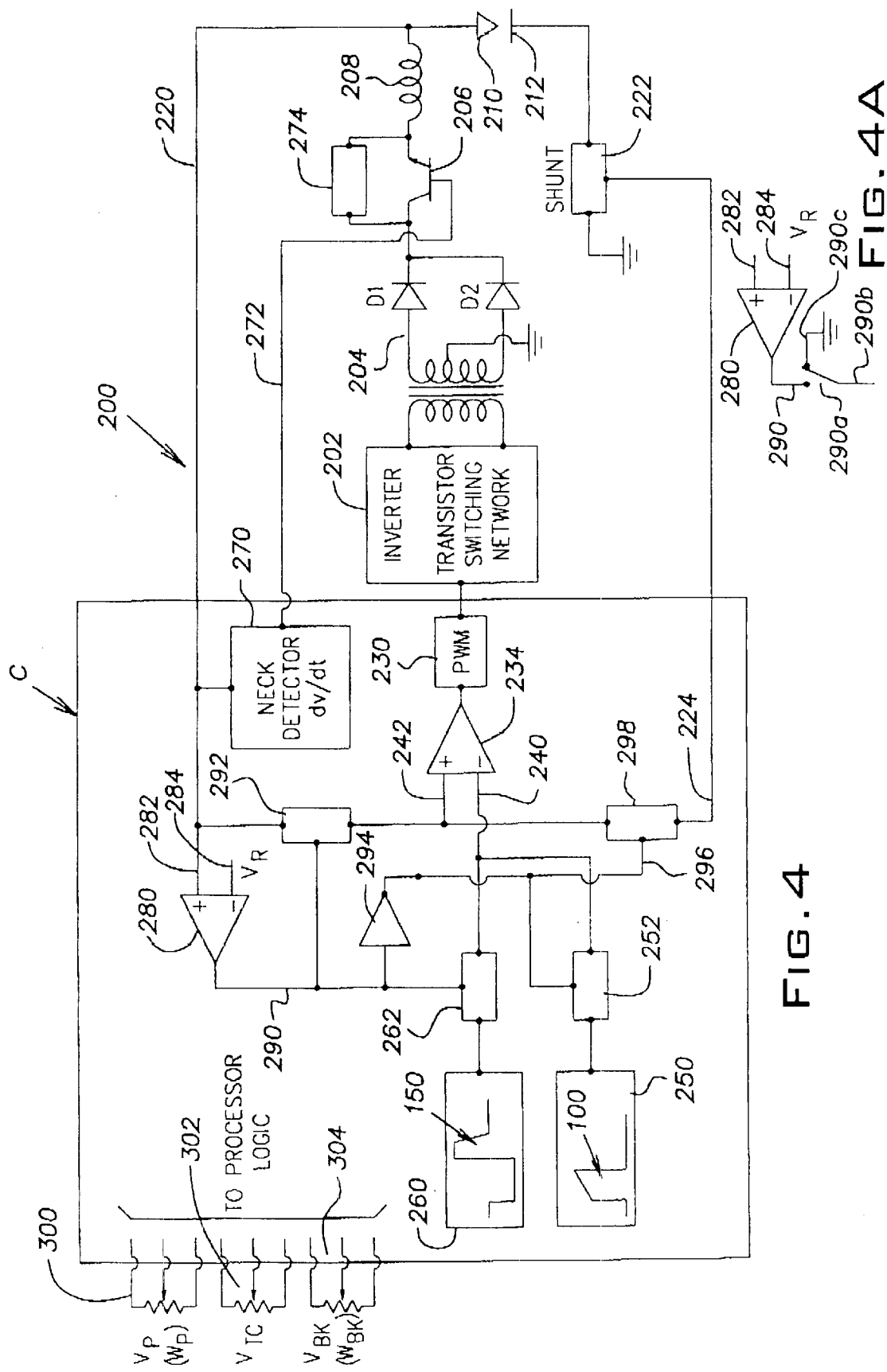
FIG. 4 is a block diagram and logic chart illustrating the techniques used in the preferred embodiment of the present invention.
FIG. 4A is a partial logic diagram showing the current override switch used at a selected position at the end of the arc condition.

In practicing the invention, the preferred embodiment employs a digital control scheme illustrated in block diagram and logic chart 4 wherein welder 200 has a logic processor based controller C programmable to implement a short circuit arc welding process, such as an STT short circuit welding process. Inverter 202 has a standard rectified output circuit 204 for directing current through switch 206 and inductor 208 to electrode 210 in the form of an advancing wire used to weld workpiece 214. Voltage feedback 220 directs the level of the arc voltage back to digital controller C. In a like manner, shunt 222 directs the instantaneous arc current back to controller C by feedback line 224. In accordance with standard control technology, the logic processor in controller C includes a digitally implemented pulse width modulator 230 having an input digitized error amplifier 232 with a waveform control represented by line 240. Pulse width modulator 230 causes inverter 202 to follow the waveform on line 240 based upon the feedback value in line 242. In accordance with standard practice, a current waveform generator 250 is provided to give the desired profile of the current pulse between the electrode and workpiece during various portions of the weld cycle. In this invention, the current waveform generator 250 is used by pulse modulator 230 for only a portion of the time or segment of the weld cycle as determined by the conductive state of digital enable switch 252. When the switch is enabled, generator 250 controls the logic on line 240 so that the feedback level on line 242 follows the desired precise current profile. In accordance with the invention, a voltage waveform generator 260 is also provided. Generator 260 has an output directed through digital enable switch 262 to input 240. Switch 252 and switch 262 are anti-coincident. When one enable switch is closed, the other enable switch is opened. Thus, error amplifier 234 receives a waveform generated from either the current waveform generator 250 or the voltage waveform generator 260 according to the conductive condition of switch 252, 262. In accordance with standard technology, a premonition circuit 270, indicated as a dv/dt circuit, creates a logic in line 272 for opening switch 206 when the metal transfer is near the breaking point. Resistor 274 is then inserted into the weld circuit to reduce current along portion 110c. To shift between the current mode and voltage mode, a digitized comparator 280 has a positive input 282 connected with the voltage feedback 220 and a negative input 284 controlled by reference voltage $V_R$. Output line 290 of comparator 280 is connected to a voltage mold digital switch 292. The logic on line 290 is inverted by inverter 294 to provide the opposite logic on line 296 for controlling current mode switch 298. In operation, when the voltage decreases on line 222 at the start of a short, a logic zero appears in line 290. This deactivates switch 292 and switch 262. Inverter 294 produces a logic 1 in line 296. This activates switch 298 so the current feedback level in line 224 is directed to input 242 of error amplifier 234. At the same time, the logic 1 on line 296 enables digital switch 252 so waveform generator 250 is connected to input 240 of the error amplifier. During this operation, the inverter 220 follows waveform 100 from generator 250. At the end of the short, voltage shifts up on line 170 shown in FIG. 3. Then, the value on input 282 exceeds the reference voltage on line 284. A logic 1 is created in line 290 for closing voltage mode switch 292 and enabling switch 262 so generator 260 controls the logic on line 240. At this same time, switches 252 and 298 are deactivated. The feedback voltage signal on line 220 is directed through switch 292 to input 242. In this manner, inverter 202 follows waveform 150 of voltage waveform generator 260. This generator could also be a wattage waveform generator or a joules waveform generator. All of these iterations have been practiced to control the arc condition of the short circuit welding process. For setup, rheostat 300 adjusts the peak voltage or the peak wattage in the waveform of generator 260. In a like manner, rheostat 302 control the time constant for the tailout and rheostat 304 controls the background voltage or wattage for the waveform from generator 260. The logic scheme disclosed in FIG. 4 is processed by digital technology in controller C and a variety of digital techniques can be used to accomplish the objective of generally operating the arc condition by a waveform tracking the desired function of voltage. In the past, the waveform during the arc condition has been merely an extension of the short circuit waveform so that the advantage of controlling the arc as a voltage function was not available.

In some situations, after the molten ball has been formed, it is desirable to shift to current control during the arc condition. A digital switch is employed where the logic processor opens line 290 by a switch 290a illustrated in FIG. 4A. This two pole switch concept grounds line 290b by ground 290c. This places a logic zero on line 290b to shift the switches to current control. This switch action is selected by the logic processor and is after the molten ball is formed by the plasma boost pulse.

Figure 5:
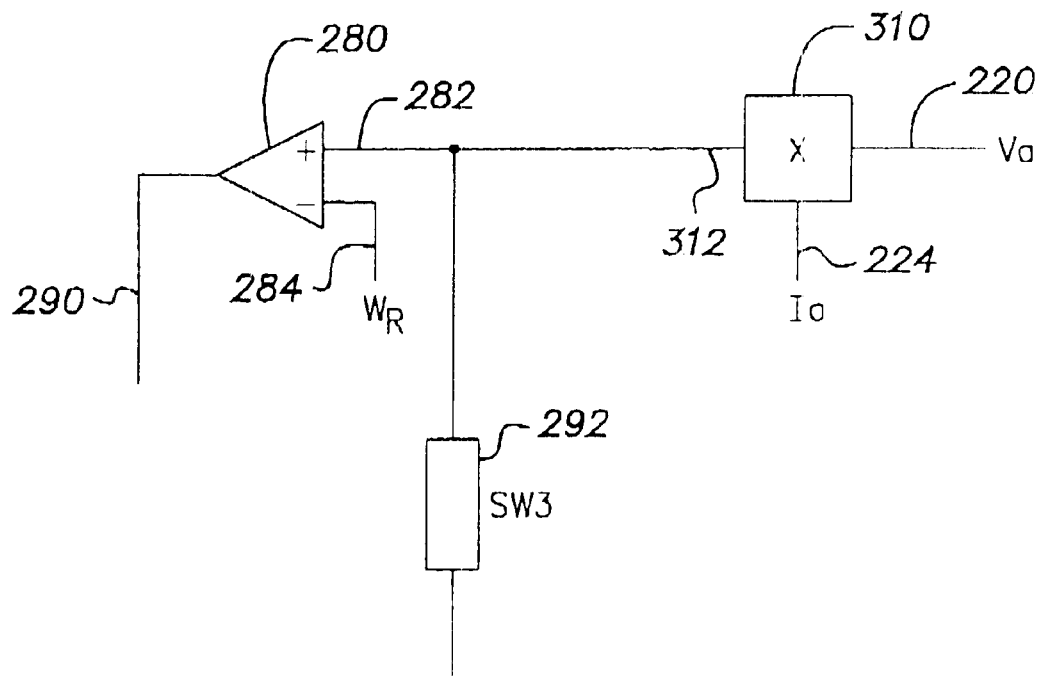
FIG. 5 is a partial logic diagram for modification of the block diagram and logic chart in FIG. 4; and, FIG. 6 is a partial logic diagram of a further modification of the implementation of the invention as shown in FIG. 4.
Figure 6:
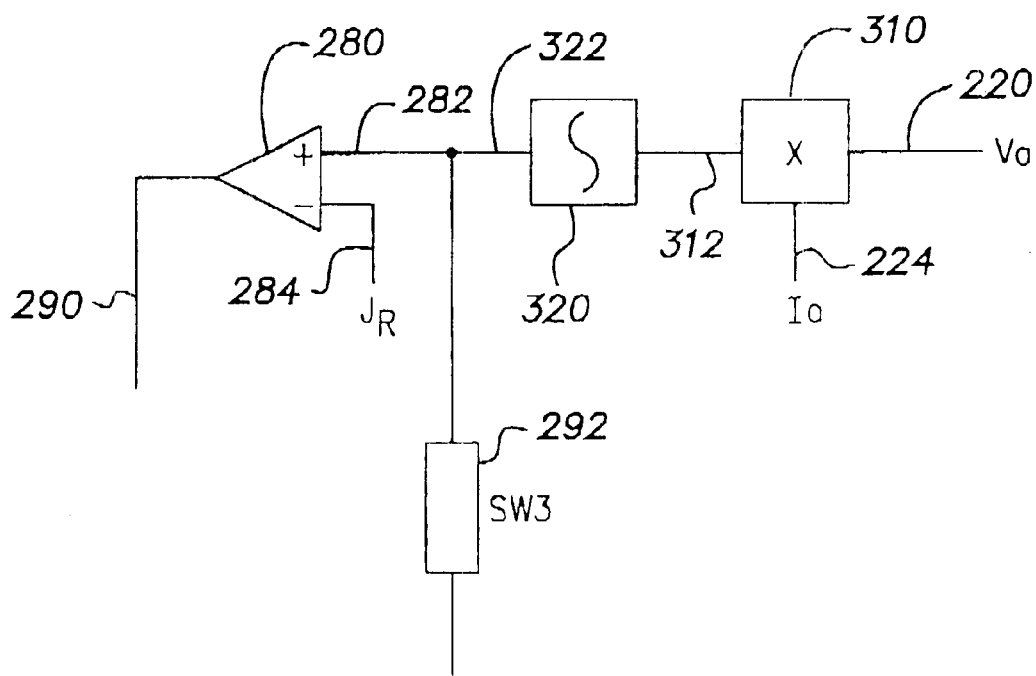

FIGS. 5 and 6 illustrate slight modifications of the block diagram and logic chart of FIG. 4. In FIG. 5, the voltage function is wattage; therefore, the inputs of line 282 of comparator 280 is the product of the voltage feedback on line 220 and current feedback on line 224. These values are combined by the multiplier 210 to produce a value in line 312 representing the wattage feedback. The current feedback 224 is used at the input of switch 298 as previously shown in FIG. 4. By using the slight modification shown in FIG. 5 for the digital processing in controller C, the arc condition is controlled by a wattage feedback while the short condition is controlled as shown in FIG. 4 by a current feedback. In FIG. 6, the product in line 312 is integrated by integrator 320 to produce a joules feedback in line 322. This is directed to the positive input 282 of comparator 280 and to the input of switch 292 so the arc condition is controlled by a waveform that is a precise reflection of the desired joules. Other such changes in the digital processing schematically illustrated in FIG. 4 can be used so long as the pulse portion of the arc condition is controlled by a waveform that is a precise representation of a voltage function. The voltage rating of the power supply will not be exceeded by anomalies in the welding process.

Having thus defined the invention, the following is claimed:

1. An electric arc welder operated to perform a short circuit process with a first waveform controlling a short condition followed by a second waveform controlling an arc condition, said welder comprising a comparator system to create an arc signal when said short condition terminates and a controller shifting said welder from control by said first waveform to control by said second waveform in response to creation of said arc signal, wherein said first waveform is a current waveform and said second waveform is at least one of a voltage waveform, a wattage waveform, or a joules waveform.

2. An electric arc welder as defined in claim 1 wherein said comparator system is further designed to create a short signal when said short condition is indicated and said controller shifting said welder from control by said at least one of said voltage waveform, said wattage waveform or said joules waveform to control by said current waveform in response to creation of said short signal.

3. An electric arc welder as defined in claim 2 including an override switch to force current control of said power supply during arc condition.

4. An electric arc welder as defined in claim 1 wherein said controller creates a series of current pulses at a frequency of over 18 kHz to perform said short circuit process.

5. An electric arc welder as defined in claim 4 including an override switch to force current control of said power supply during arc condition.

6. An electric arc welder as defined in claim 1 including an override switch to force current control of said power supply during arc condition.

7. A method of controlling, by a controller, an electric arc welder operated to perform a short circuit process with a short condition followed by an arc condition, said method comprising:
   (a) determining existence of one of said short condition and said arc condition;
   (b) operating in a first current control mode when the determining step indicates said short condition exists; and,
   (c) operating in a second control mode when the determining step indicates said arc condition exists, said second control mode being at least one of a voltage control mode, a wattage control mode, or a joules control mode.

8. The method as defined in claim 7 further including:
   (d) causing a series of current pulses at a frequency of over 18 kHz to perform said short circuit process.

9. The method as defined in claim 8 wherein said current pulses form a controlled waveform during said short circuit process.

10. An arc welder designed to perform a short circuit process having a short condition and an arc condition, wherein a welding operation is achieved between an electrode and a workpiece, the arc welder comprising: a comparator system to determine when said short condition terminates and said arc condition exists; and a controller responsive to said comparator system and having (i) a current control mode, while in the short condition, wherein a predesigned high frequency current waveform generated by said current control mode defines a first current pulse provided to said electrode and, (ii) at least one of a voltage control mode, a wattage control mode or a joules control mode while in said arc condition, wherein at least one of a predesigned high frequency voltage waveform generated during said voltage control mode, a predesigned high frequency wattage waveform generated during said wattage control mode, and a predesigned high frequency joules waveform generated during said joules control mode, define a second current pulse provided to the electrode.

11. An electric arc welder as defined in claim 10 wherein said voltage waveform provides a pre-determined peak voltage value, and changes to current at the electrode are dependent on a value of said pre-determined peak voltage value of said voltage waveform.

12. An electric arc welder as defined in claim 10 wherein said wattage waveform provides apre-determined peak wattage value, and changes to current at said electrode are dependent on a value of said pre-determined peak wattage value of said wattage waveform.

13. An electric arc welder as defined in claim 10 wherein said joules waveform provides a pre-determined peak joules value, and changes to current at said electrode are due to said pre-determined fixed peak joules value of said joules waveform.

14. An electric arc welder as defined in claim 10 wherein in addition to said voltage waveform having a peak voltage value, said voltage waveform also includes a background voltage value.

15. An electric arc welder as defined in claim 10 wherein in addition to said wattage waveform having a peak wattage value, said wattage waveform also includes a background wattage value.

16. An electric arc welder as defined in claim 10 wherein in addition to said joules waveform having a peak joules value, said joules waveform also includes a background joules value.

17. An electric arc welder as defined in claim 10 wherein said controller operates to perform a surface tension transfer (SST) welding process.

18. An electric arc welder as defined in claim 10 wherein said controller is implemented by a single power supply.

19. An electric arc welder as defined in claim 10 wherein said comparator system is further designed to create a short signal when said short condition is indicated and said controller shifting said welder from control by said at least one of said voltage waveform, said wattage waveform or said joules waveform to control by said current waveform in response to creation of said short signal.

20. An electric arc welder as defined in claim 10 wherein said controller creates a series of current pulses at a frequency of over 18 kHz to perform said short circuit process.

21. An electric arc welder as defined in claim 20 including an override switch to force current control of said power supply during arc condition.

22. A method of operating an arc welder designed to perform a short circuit process having a short condition and an arc condition, the method comprising:

determining when the short condition terminates and the arc condition exists;

operating in a current control mode while in the short condition;

defining a first current pulse while in the current control mode;

providing the first current pulse to an electrode of the arc welder;

operating in at least one of a voltage control mode, a wattage control mode or a joules control mode while in the arc condition;

generating at least one of a high frequency voltage waveform during the voltage control mode, a high frequency wattage waveform during the wattage control mode, and a high frequency joules waveform during the joules control mode;

defining a second current pulse, from at least one of the high frequency voltage waveform, the high frequency wattage waveform and the high frequency joules waveform; and providing the second current pulse to the electrode.

23. The method as defined in claim 22 further including, causing a series of current pulses at a frequency of over 18 kHz to perform said short circuit process.

24. The method as defined in claim 23, wherein said current pulses form a controlled waveform during said short circuit process.

* * * * *